United States Patent [19]

Numoto et al.

[11] Patent Number: 4,765,181

[45] Date of Patent: Aug. 23, 1988

[54] SURFACE TEXTURE MEASURING INSTRUMENT

[75] Inventors: Minoru Numoto; Tsutomu Kanzaki, both of Mitaka, Japan

[73] Assignee: Tokyo Seimitsu Co., Ltd., Tokyo, Japan

[21] Appl. No.: 82,925

[22] Filed: Aug. 5, 1987

Related U.S. Application Data

[63] Continuation of Ser. No. 894,144, Aug. 7, 1986, abandoned.

[30] Foreign Application Priority Data

Aug. 8, 1985 [JP] Japan ................................ 60-174836
Aug. 8, 1985 [JP] Japan ........................ 60-121889[U]

[51] Int. Cl.$^4$ .............................................. G01B 5/28
[52] U.S. Cl. ................................................. 73/105
[58] Field of Search ................................. 73/104, 105

[56] References Cited

U.S. PATENT DOCUMENTS

| | | | |
|---|---|---|---|
| 2,404,143 | 7/1946 | Reason | 73/105 |
| 2,405,133 | 8/1946 | Brown | 73/105 |
| 2,460,726 | 2/1949 | Arndt, Jr. | 73/105 |
| 2,620,655 | 12/1952 | Priest | 73/105 |
| 3,049,002 | 8/1962 | Hediger | 73/105 |
| 3,087,329 | 4/1963 | Von Grodek et al. | 73/105 |
| 3,283,568 | 11/1966 | Reason | 73/105 |
| 3,377,828 | 4/1968 | Harmon | 73/105 |
| 4,133,204 | 1/1979 | Mittleman | 73/105 |
| 4,574,625 | 3/1986 | Olasz et al. | 73/105 |
| 4,665,739 | 5/1987 | Mizuno | 73/105 |

FOREIGN PATENT DOCUMENTS

| | | | |
|---|---|---|---|
| 0220391 | 3/1985 | Fed. Rep. of Germany | 73/105 |
| 0050783 | 4/1977 | Japan | 73/105 |
| 58-24723 | 5/1983 | Japan . | |
| 630848 | 10/1949 | United Kingdom | 73/105 |
| 1549410 | 8/1979 | United Kingdom | 73/105 |

OTHER PUBLICATIONS

Tokyo Seimitsu Co., Ltd., "Surfcom 100b", (Surface Texture and Contour Measuring Instrument), Feb. 1983, pp. 3–4.

Primary Examiner—Stewart J. Levy
Assistant Examiner—Robert R. Raevis
Attorney, Agent, or Firm—Armstrong, Nikaido, Marmelstein & Kubovcik

[57] ABSTRACT

A surface texture measuring instrument comprises an immovable casing located on an object, a movable pick-up for detecting a surface roughness of the object, and a driving unit in the casing for driving the pick-up. The pick-up comprises a skid having a curved surface for absorbing a waviness component of the surface of the object, and a stylus in the skid for detecting the surface roughness thereof. The stylus is slightly deviated from a center of the curved surface to give a more accurate measurement of the surface roughness.

15 Claims, 4 Drawing Sheets

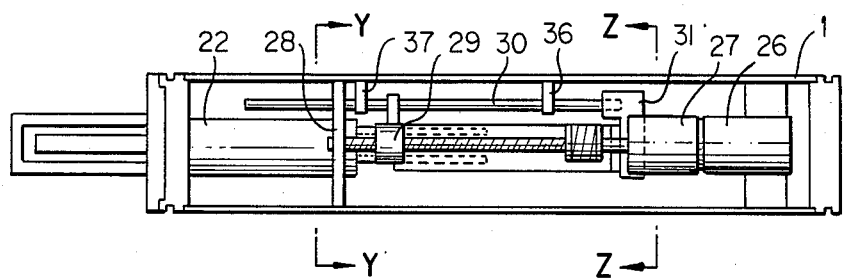
Fig. 2A
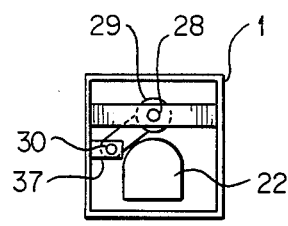 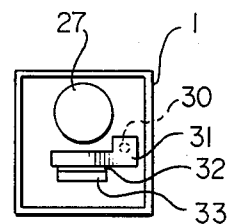
Fig. 2B          Fig. 2C

SURFACE TEXTURE MEASURING INSTRUMENT

This application is a continuation of application Ser. No. 894,144, filed Aug. 7, 1986, now abandoned.

BACKGROUND OF THE INVENTION

1. Field of the Invention

The present invention is related to a surface texture measuring instrument. More particularly, it is related to a surface roughness measuring instrument which can be easily and directly located on a surface of an object to be measured even when measuring a large-sized object.

2. Description of the Related Art

In general, a conventional surface texture measuring instrument has a table on which the object to be measured is located. But, when the surface texture of the large-sized object that cannot be located on the table because of its size or weight is to be measured, a method of measuring the surface texture of the object is used wherein the large-sized object is cut into small pieces, to enable it to be located and measured on the table, or by replica plating, and so on. These methods are disadvantageous in that a lot of time and effort is needed to measure the surface texture of the object by using a conventional instrument. Although some of the conventional instruments can be directly located on the surface of the object without the need for the table, to increase the accuracy of the measurement, the user must adjust the pick-up to a zero-potential, which means that the longitudinal axis of the pick-up and the traversing direction of the pick-up become substantially parallel to the surface of the object, before starting the measurement. The same disadvantages as described above are incurred for the adjustment process. Additionally, the conventional instrument usually comprises a pick-up, a driving unit for driving the pick-up, a datum level plate enclosed in the driving unit, and a guide block on the datum level plate for movably supporting the pick-up; the guide block being driven by the driving unit on the surface of the datum level plate. The instrument constructed as described above is, however, relatively heavy and large, has a relatively large and heavy datum level plate, and is not easily carried and placed on an object to be measured by a user.

SUMMARY OF THE INVENTION

Therefore, an object of the invention is to provide a surface texture measuring instrument which is compact and portable, and thus can be easily and directly located on the surface of all objects to be measured, and by which an user can start the measurement without the need for any adjustments as soon as the instrument has been located on the surface of the object to be measured.

More particularly, the object of the invention is to provide a surface texture measuring instrument with which it is possible to carry out a more accurate measurement of a roughness component excluding a waviness component of the surface texture.

Note, these roughness and waviness components are defined in this description as follows;

Roughness component: The irregularities in the surface texture which are inherent in products but excluding waviness and errors of form are referred to herein as high-frequency variations.

Waviness component: The component in the surface texture upon which roughness is superimposed, for example, work deflections, vibrations, chatter, etc., are referred to herein as low-frequency variation.

In accordance with the invention, the above objects are accomplished by a surface texture measuring instrument comprising, an immovable casing which can be directly located on the surface of the object to be measured, pick-up means for coming into contact with the surface of the object to detect the surface roughness component of the object, the pick-up means being movable on the surface of the object relative to the casing so as to follow the surface roughness of the object, and driving means in the casing for moving the pick-up means on the surface of the object. Preferably, the casing comprises at least one datum level surface at the bottom thereof for stabilizing the instrument and for making the longitudinal axis of the pick-up means and the traversing direction of the pick-up means to be substantially parallel to the surface of the object while the datum level surface is in contact with the surface of the object.

According to an another aspect of the invention, the pick-up means comprises a stylus movable in relation to the casing in such a manner that it is displaced in accordance with the surface roughness component, a skid for absorbing the waviness component of the surface texture, and the skid being provided on a curved contacting surface with an eccentric vertical hole through which the stylus passes, and the hole is slightly and traversely deviated from a center of the contacting surface.

BRIEF DESCRIPTION OF THE DRAWINGS

The invention will be discussed in detail below with reference to the accompanying drawings, in which:

FIG. 2A is a top sectional view at line X—X, FIG. 2;

FIG. 2B is a sectional view at line Y—Y, FIG. 2A;

FIG. 2C is a sectional view at line Z—Z, FIG. 2A;

DESCRIPTION OF THE PREFERRED EMBODIMENTS

Figure 1:
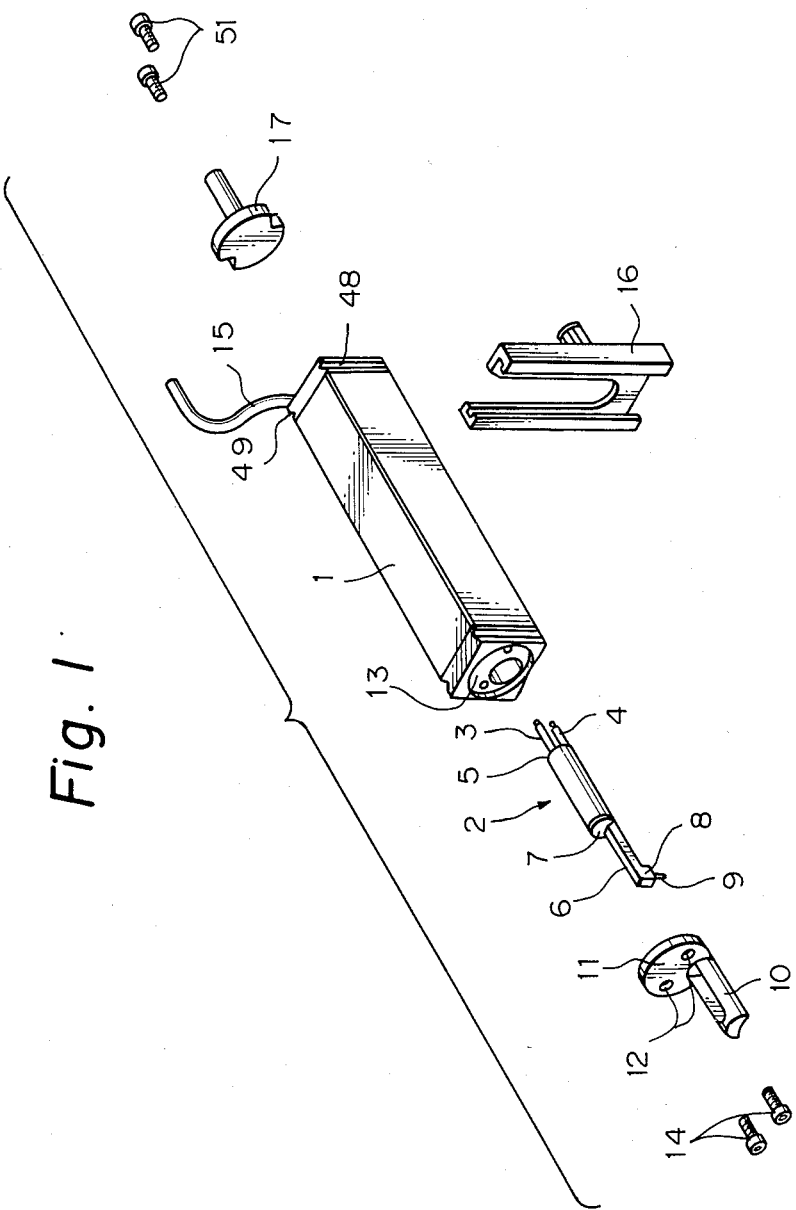
FIG. 1 is an exploded perspective view of an embodiment of the invention.

With reference to FIG. 1, the surface texture measuring instrument of the invention comprises a casing 1 and a pick-up 2. The pick-up 2 has electrical connecting rods 3 and 3a protruding from a rear end 5 thereof, and a skid 6 protruding from a front end 7 thereof. The pick-up 2 is detachable connected in the casing 1 by means of the connecting rods 3 and 3a, and thus a user can exchange the pick-up 1 for another kind of pick-up (not shown) according to the objects to be measured. A stylus 9, which comes into contact with the object to be measured, is downwardly protruded form an edge 8 of the skid 6.

In this embodiment, a protection cover 10 having a flange 11 provided with holes 12 at the end of the cover 10, is provided to surround the stylus 9 and a portion of the skid 6. When the instrument is assembled, the cover 10 is mounted to a front end 13 of the casing 1 by screws 14 inserted and tightened in the holes 12, after the pick-up 2 is connected to the casing 1.

Figure 2:
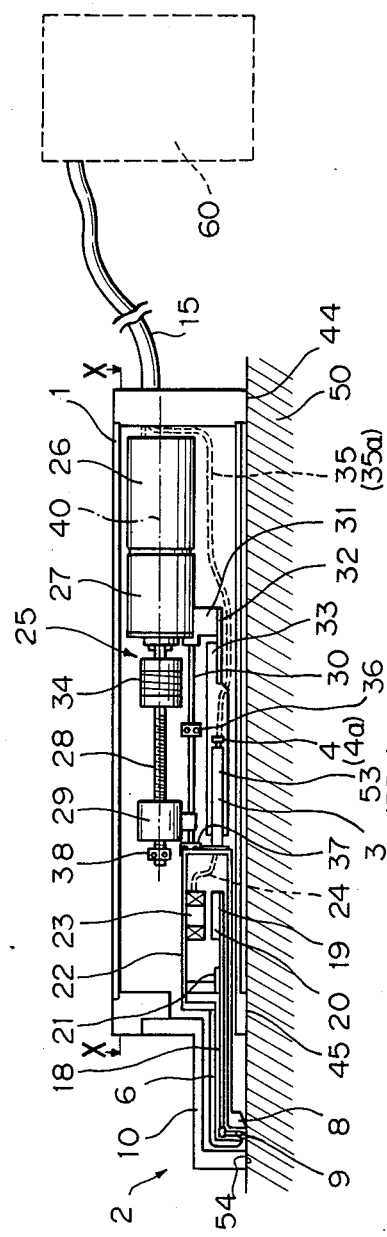
FIG. 2 is a longitudinal sectional view of the embodiment of the invention.

FIG. 2 is a longitudinal sectional view of the parts of the instrument as shown in FIG. 1, when assembled. Referring to the drawing, the stylus 9 is secured to a lever 18, which is longitudinally extended in the skid 6 without coming into contact with the skid 6, and a magnetic plate 20 is provided on an end 19 of the lever 18. The lever 18 with both the stylus 9 and magnetic plate 20 is movably supported relative to a shell 22 of the pick-up 2 by means of a leaf spring 21.

Additionally, a converter 23 is secured to the shell 22 in such a manner that the magnetic plate 20 will face the converter 23 at a distance. The converter 23 serves to convert the displacement of the magnet plate 20 proportional to that of the stylus 9 into an electrical signal. The electrical signal generated in the converter 23 is transmitted to the connecting rods 3 and 3a through signal cables 24. Since the converter 23 is an inductance type converter, the construction of the pick-up 2 is simplified and made more compact, because the inductance type of converter has only two output terminals (not shown) instead of the four terminals of a conventional differential type of converter (not shown).

Enclosed in the casing 1 is a driving unit 25 for moving the pick-up 2 on the surface of an object 50. The driving unit 25 comprises a motor 26 supported by the casing 1, a speed reducer 27 connected to the motor 26 for reducing the output speed thereof, a feed screw 28, a flexible coupling 34 for connecting the feed screw 28 to the speed reducer device 27 in a substantial alignment therewith, a nut 29 threadingly engaged by the feed screw 28, a guide rod 30 secured to the nut 29 for guiding the axial movement of the pick-up 2, a block 31 fixed at the end of the guide rod 30, a connector holder 33 elastically connected to the block 31 by means of a leaf spring 32, the holder 33 movably supporting the pick-up 2 in the casing 1, on bearings 36 and 37 for supporting the guide rod 30, and a bearing 38 for supporting the feed screw 28.

The leaf spring 32 which connects the connector holder 33 to the block 31 serves to absorb vertical movement of the pick-up 2 due to the surface texture of the object 50. The holder 33 is made of an electrical insulating material and comprises two holes 53 and 53a into which the connecting rods 3 and 3a are inserted, electrical contact terminals 4 and 4a in the holes 53 and 53a for coming into contact with the connecting rods 3 and 3a when the latter are located in the connector holder 33, and cables 35 and 35a for transmitting electrical signals from the connecting terminals 4 and 4a to an outside display means 60.

During a measurement, a casing 1 is directly located on the surface of the object 50 in an immovable state and the nut 29 is fed along the longitudinal axis 40 by the rotation of feed screw 28. The movement of the nut 29 is transmitted through the guide rod 30, the block 31, the leaf spring 32, and the holder 33 to the pick-up 2. Consequently, the pick-up 2 can follow the contour of the surface of the object 50. Note, the connecting rod 3 and 3a serve to transmit not only electrical signals but also the driving force of the motor 26.

During a traversing movement of the pick-up 2, the skid 6 fixed to the shell 22 is not sensitive to the roughness component but to the waviness component in the surface texture, because the edge 8 of the skid 6 is provided with a curved contacting surface having a curvature much larger than that of the stylus 9. On the other hand, the stylus 9 is sensitive to both the roughness and the waviness components. The electrical signal generated in the converter 23 corresponds, however, to only the variation of the roughness component because the converter 23 secured in the shell 22 moves as the skid 6 moves. Thus, variation of the clearance between the converter 23 and the magnetic plate 20 is proportional to the variation of the roughness component produced in the vertical movement of the stylus 9. In other words, the provision of the skid 6 makes it possible to absorb the waviness component since it is movably connected to the casing 1, and the movement of the skid 6 is different to the movement of the stylus 9.

Figure 3:
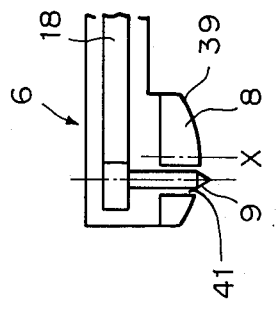
FIG. 3 is a longitudinal partially sectional view of the pick-up of the invention.

Referring to FIG. 3, the skid 6 has a curved contacting surface 39 which comes into contact with the surface of the object 50 adjacent to the stylus 9, so that one point of the surface 39 is always in contact with the object 50 regardless of the degree of inclination of the skid 6. Additionally, the skid 6 is provided with a vertical hole 41 through which the stylus 9 passes.

Figure 4:
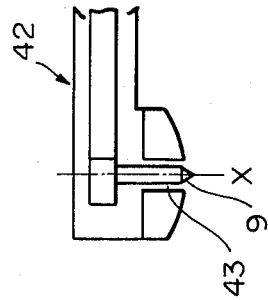
FIG. 4 is a longitudinal partially sectional view of the prior art similar to FIG. 3.

According to the invention, the hole 41 is formed to be slightly and traversely deviated from a central axis X of the contacting surface 39. The reason is because, as shown in FIG. 4, a conventional skid 42 having a stylus-hole 43 formed along the central axis X would not come into contact with the surface of the object at one point but at several points around the hole 43, if the central axis X is in contact with the surface of the object at a right angles. Consequently, the waviness measurement derived from these several contacting points makes the obtained value of the roughness component unreliable. Preferably, the deviation is 0.4–1.2 mm from the central axis X in a longitudinal direction.

Figure 5:
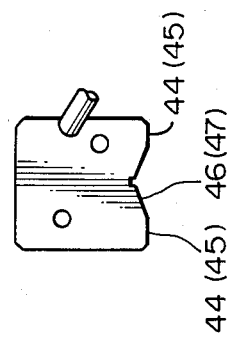
FIG. 5 is a rear end view of the embodiment of the invention.

Referring to FIG. 2 and FIG. 5. According to the invention, the casing 1 comprises two datum level surfaces 44 and 45, at the bottom thereof, which come into contact with the surface of the object 50 during the measurement, to stabilize the instrument, instead of the table of the conventional instrument.

As shown in FIG. 2, the datum level surfaces 44 and 45 are formed in such a manner that, if the instrument is located on a substantially planar surface, the stylus 9 and the skid 6 come into contact with the planar surface without coming into contact with each other, and the longitudinal direction of the lever 18 having the stylus 9, which corresponds to the traversing direction of the pick-up 2, becomes parallel to the planar surface. This formation makes it possible for the user to immediately start to measure the object 50 without making the usual adjustment to the zero-potential needed for the convential pick-up.

In order to make the traversing direction of the pick-up 2 become parallel to the planar surface, the guide rod 30 for guiding the axial movement of the pick-up 2 is also supported at the casing 1 so as to be parallel to the datum level surfaces 44 and 45. Thus, the guide rod 30, supported as above, enables the datum level plate otherwise necessary in prior art devices and which is relatively large and heavy, to be dispensed with and, thereby reduce the size and weight of the instrument itself.

Preferably, where the object is very small and thus the casing 1 cannot be located thereon (see FIG. 9 and FIG. 10), the cover 10 is mounted on the casing 1 in such a way that a bottom-face 54 of the cover 10 and the datum level surfaces 44 and 45 are all on one plane. In this case, the cover 10 instead of the datum level surfaces 44 and 45 functions to stabilize the instrument.

Figure 7:
Figure 8:

As will be readily apparent, the two datum level surfaces 44 and 45 may be replaced by only one surface having a contacting surface wide enough to stabilize the instrument on the surface to be measured. Preferably, the datum level surfaces 44 and 45 are provided with recesses 46 and 47, respectively. The recesses 46 and 47 in this embodiment are V-shaped grooves and serve to stabilize the casing 1 when measuring the roughness of a cylindrical object 53, as shown in FIG. 7 and FIG. 8. As will be readily apparent, the recesses 46 and 47 of the invention are not limited to V-shaped grooves in this embodiment and alternative forms of construction may be used, for example, rounded grooves (not shown).

Referring again to FIG. 1, preferably, the casing 1 is provided with at least one pair of parallel side grooves 48 and 49 at the rear end of the casing 1. The grooves 48 and 49 serve to adjust the height of the located casing 1, by engaging with a height adjusting member 16, as required by the object to be measured.

Furthermore, the casing 1 comprises a racket for an attachment 17 which is mounted on the rear end of the casing 1 by screws 51. The bracket for the attachment 17 can also serve to stabilize the casing 1 by connecting the bracket 17 to a magnetic stand 52 (FIG. 9 and FIG. 10), when measuring an object having a surface which is too narrow and limited for the casing 1, to be located thereon, etc. The magnetic stand 52 shown in FIG. 9 and FIG. 10 may be conventional type of stand having a magnet (not shown) at the bottom thereof and a slidable screw on an arm for clamping the bracket 17.

Although in the foregoing description a signal cable 15 is used to transmit the electrical signals to the outside display means 60, as shown in FIG. 2 the display means 60 may be an digital-display unit or a conventional analog-display unit and may comprise a power unit (not shown) for driving the motor 26, if necessary.

Figure 6:
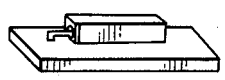
FIGS. 6–12 are schematic illustrations which show how to locate the instrument of the invention in accordance with the objects to be measured.
Figure 9:
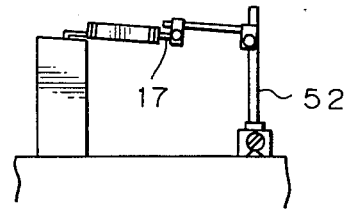
Figure 10:
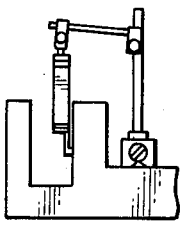
Figure 11:
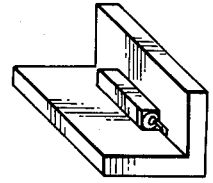
Figure 12:
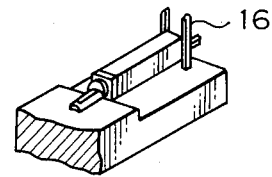

FIGS. 6 to 12 illustrate ways of locating the instrument as described in the foregoing in accordance with examples of objects having different shapes. In these figures, FIG. 6 shows an example of use of the datum-level surfaces 44 and 45 in FIG. 2 and FIG. 5. FIG. 7 and FIG. 8 show examples of use of the recesses 46 and 47 formed in the datum-level surfaces 44 and 45 in FIG. 5. FIG. 9 and FIG. 10 show examples of use of the bracket 17 and the cover 10 in FIG. 1 with the magnetic stand 52. FIG. 11 also shows an example of use of the datum-level surfaces 44 and 45 in FIG. 2 and FIG. 5. Finally, FIG. 12 shows an example of use of the grooves 48 and 49 and the cover 10 in FIG. 1 with the height adjusting member 16.

We claim:

1. A surface texture measuring instrument, comprising a casing which can be directly located on a surface of an object whose surface texture is to be measured, said casing having a bottom surface which defines a flat datum-level surface and which is provided with a recessed v-shaped groove defined by converging surfaces, detachable pick-up means for attachment to and detachment from said instrument, said pick-up means, when attached to said instrument being engagable with the surface of the object to be measured for detecting the surface roughness of said object, said attached pick-up means being movable over the surface of said object relative to said casing so as to follow surface roughness of said object, and driving means in said casing for moving said attached pick-up means over the surface of said object, said attached pick-up means comprising a stylus which projects outward from said casing to move over and come into contact with said surface, said stylus being movable vertically by said roughness at the point of contact, a skid having a curved surface in contact with the surface of said object adjacent to said stylus and the engagement of said stylus with said surface and movably connected to said casing independent of said vertical movement of said stylus, said curved surface having a vertical hole through which said stylus at such point of contact of said stylus with said surface passes, said hole being off-set from a center of said curved surface, a converter for converting the displacement of said stylus by the roughness of said surface at the point of contact into electrical signals, and a shell movably supported in said casing and housing said converter, said shell comprising an electrical connector supported by said shell and electrically connected to said converter, said driving means comprising a connector holder for holding said connector therein, said connector holder having connecting terminals for connection to said connector when said connector is located in said connector holder.

2. A surface texture measuring instrument according to claim 1, wherein said converter is an inductance type converter.

3. A surface texture measuring instrument according to claim 2, wherein said stylus has a lever integral therewith, said lever having a magnetic plate on one end which faces said inductance type converter.

4. A surface texture measuring instrument according to claim 1, wherein said driving means comprises a motor supported by said casing, a feed screw connected to said motor for rotation thereby, a nut member threadingly engaged by said feed screw, so that rotation of said feed screw causes the nut member to move axially, said nut member being connected to said shell.

5. A surface texture measuring instrument according to claim 4, further comprising a flexible coupling between said motor and said feed screw.

6. A surface texture measuring instrument according to claim 4, further comprising a speed reducer connected to said motor to reduce the output speed of said motor.

7. A surface texture measuring instrument according to claim 1, wherein said driving means comprises a motor supported by said casing, a feed screw connected to said motor for rotation thereby, a nut member threadingly engaged by said feed screw, so that rotation of said feed screw causes the nut member to move axially, said nut member being connected to said shell and at least one guide rod supported at said casing and connected to said nut member to guide said axial movement of said pick-up means.

8. A surface texture measuring instrument according to claim 7, further comprising first means for movably supporting said shell in said casing.

9. A surface texture measuring instrument according to claim 8, wherein said first movably supporting means comprises a first leaf spring elastically connecting said connector holder to said guide rod, so that said shell can move axially together with said nut member.

10. A surface texture measuring instrument according to claim 9, further comprising second means for movably supporting said stylus relative to said shell.

11. A surface texture measuring instrument according to claim 10, wherein said second means comprising a second leaf spring elastically connecting said stylus to said shell.

12. A surface texture measuring instrument according to claim 1, further comprising a protection cover on said casing for at least partially surrounding said skid and said stylus.

13. A surface texture measuring instrument according to claim 1, further comprising a bracket for attachment on said casing to attach said casing to a magnetic stand through said bracket for attachment.

14. A surface texture measuring instrument according to claim 1, wherein said casing is provided with at least one pair of grooves opening toward each other to attach said casing to a height adjusting member.

15. A surface texture measuring instrument according to claim 1, further comprising a display means external to said casing for displaying a value of measurement and a signal cable for electrically connecting said driving means and said pick-up means to said display means.

* * * * *